3,354,067
METHOD OF PREPARING TRIALKYLBORON
COMPOUNDS
Joseph L. Shepherd, Sunland, and Samuel Witz, West
Covina, Calif., and Ellis I. Hormats, Rochester, N.Y.,
assignors to Aerojet-General Corporation, Azusa, Calif.,
a corporation of Ohio
Filed Mar. 23, 1959, Ser. No. 801,396
18 Claims. (Cl. 204—168)

This invention relates to a new and improved method for preparing alkyldihaloborines and trialkylborons.

The alkyldihaloborines and the trialkylboron compounds prepared by the method of this invention are useful as high energy fuels for airplanes and missiles. Also, the alkyldihaloborines produced as taught herein readily disproportionate to form trialkylborons, such as trimethylborons. Trialkylborons react with hydrogen in a silent discharge tube to produce alkylated diboranes, such as tetraalkyldiboranes, as more fully disclosed in assignee's copending U.S. patent application Ser. No. 470,240, filed Nov. 22, 1954, now Patent No. 2,944,951. Also, trialkylborons react with diborane to form tetraalkyldiboranes. Tetraalkyldiboranes, when added to hydrocarbon fuels such as gasoline, in amounts corresponding to about one percent by weight, dramatically improve the combustion characteristics of the fuels in internal combustion engines, as more fully disclosed in assignee's above-mentioned U.S. patent application.

Previously known procedures for preparing trialkylborons, such as through the Grignard reagent, have been costly and tedious. The present invention provides an inexpensive and convenient method of synthesizing trialkylborons from cheap and readily available starting materials and one which does not require the use of high temperatures as do other known procedures.

We have found that alkyldihaloborines are produced when mixtures of gaseous borontrihalides and alkanes are passed through silent discharge tubes under the conditions described below. We have also found that the alkyldihaloborines readily disproportionate to form their corresponding trialkylborons. These reactions proceed according to the general reaction scheme set forth below:

$$BX_3 + RH \rightarrow RBX_2$$

$$3RBX_2 \rightarrow BR_3 + 2BX_3$$

wherein R is alkyl and X is halogen.

The silent discharge tubes used in the practice of this invention are discharge tubes of the type illustrated in the accompanying drawings in which the electrodes are separated from each other by insulation, and which are energized by an alternating current of relatively high potential. Discharge tubes of this type are commonly used in the production of ozone.

The configuration and operation of the silent discharge tube will be better understood from the following detailed description and the accompanying drawings.

Figure 1:
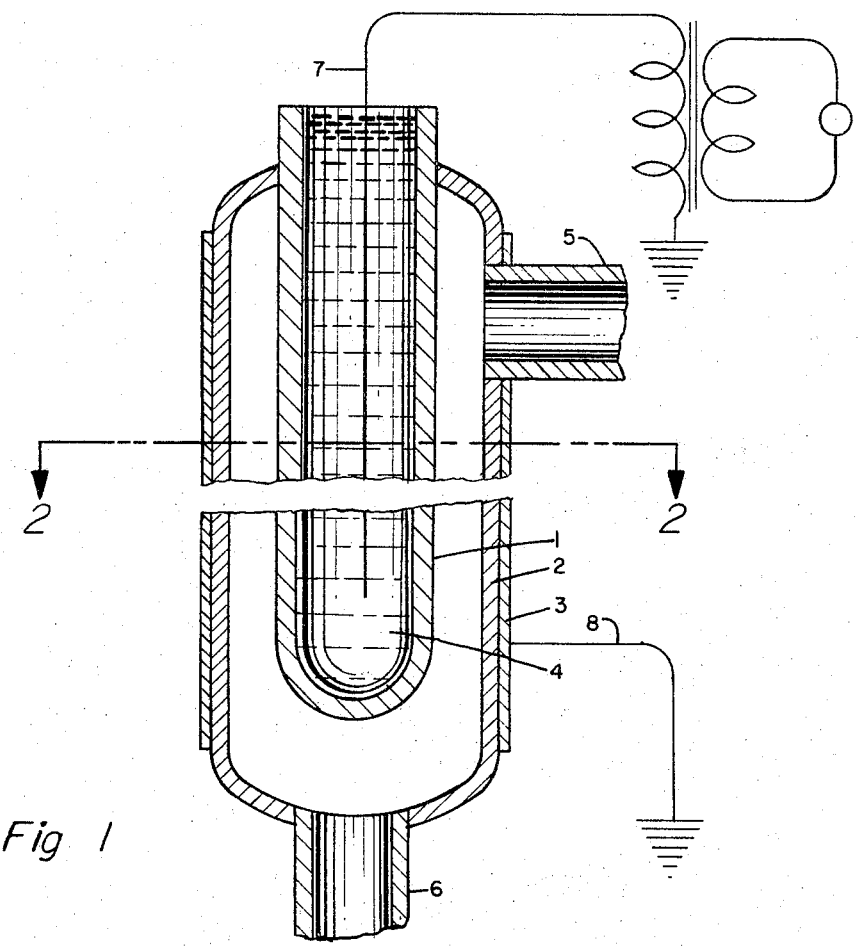
FIG. 1 is a sectional view taken on the line 1—1 of FIG. 2.
Figure 2:
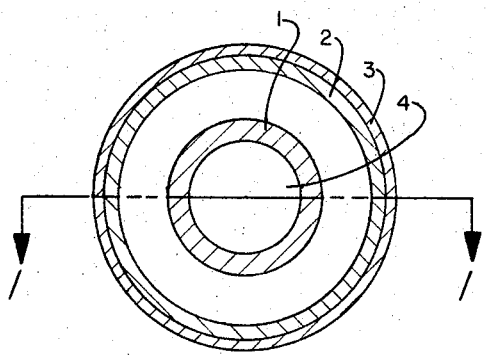
FIG. 2 is a sectional view of the tube taken on the line 2—2 of FIG. 1.

Referring to FIGS. 1 and 2 in detail, 2 is a glass tube having a gas inlet 5 and a gas outlet 6. A metal cylinder 3 tightly encloses tube 2 as shown and serves as an outer electrode. Positioned concentrically within tube 2 is an inner glass tube 1, containing an electrolyte 4, which serves as an inner electrode. The discharge tube is energized by an electric current of high voltage, applied as shown by means of leads 7 and 8.

In operating the silent discharge tube the mixture of reactant gases is placed in the annular space between the inner and outer tubes and a potential is applied to the tube through its electrodes.

To more clearly illustrate our invention, the following examples are presented. It should be understood that these examples serve merely as a means of illustrating the invention and should not be construed as limiting the invention to the particular conditions set forth therein.

EXAMPLE I

Preparation of methyldichloroborine

A mixture of methane and borontrichloride in a 4:1 molar ratio was passed through a silent discharge tube while the tube was energized by alternating current under a potential of 15,000 volts. The discharge tube had an inner tube with an outside diameter of 24 mm. and an outer tube with an inside diameter of 32 mm., the annular space or gap between the tubes thus being 4 mm. The pressure within the annular gas space was maintained at 100 mm. of Hg. The inner tube was filled with an aqueous solution of copper sulfate, which served as one electrode, and the outer tube was wrapped with brass shim material of 0.005 inch thickness which served as the other electrode. The electrodes were each about 75 cm. long. The potential of 15,000 volts was supplied by a high voltage transformer having its primary coil connected to a variable transformer operating from a 110 volt 60 cycle power source. The mixture of gases from the discharge tube was collected as a liquid condensate at the temperature of liquid nitrogen (—196° C.). This condensate was found to contain $CH_3BCl_2$, $BHCl_2$, HCl, and unreacted $BCl_3$. The $CH_3BCl_2$ was separated from the reaction mixture by fractional distillation.

EXAMPLE II

Preparation of trimethylboron

The methyldichloroborine obtained from Example I is placed in a vacuum in which it disproportionates to yield trimethylboron and borontrichloride. The trimethylboron is separated from the disproportionation mixture by a stripping process. The disproportionation is carried out in a vacuum because of the pyrophoric nature of the trimethylboron.

It is to be understood that FIGS. 1 and 2 illustrate only one of the many commercially available silent discharge tubes which may be employed in practicing this invention. Silent discharge tubes having different dimensions and different arrangements of parts, within the scope of our invention, can, of course, be used in the practice of the invention. For example, the silent discharge tube, in which the outer tube is made of a conductive material such as aluminum or copper, and thus is in direct contact with the gases passing through the tube, can be used in the practice of the present invention, if desired. With a tube such as this, the outer tube serves as the outer electrode and the wall of the inner tube, containing the electrolyte solution is thus the only insulation between the outer and inner electrodes. It should be remembered, however, that when a tube of this type is employed it is necessary to insulate the outer tube from the inner tube by the use of a dielectric material between the two tubes in any place where they would otherwise come into contact, such as at the top of the discharge tube where the outer tube closes around the inner tube to form a gas-tight seal.

In the silent discharge tubes suitable for the practice of our invention the outer electrode may be of any suitable conductive material such as aluminum, copper, zinc, silver, etc., and the electrolyte solution, which serves as the inner electrode, may be an aqueous solution of potassium chloride, sodium nitrate, copper sulfate or other suitable inorganic electrolyte well-known to those skilled in the art.

The temperature of reaction in the silent discharge tube is not critical in the practice of our invention, it being only necessary to have a sufficiently high temperature, under the operating conditions employed, to assure that the boron trihalides, aliphatic hydrocarbons, and other materials present in the tube be maintained substantially in the gaseous condition. Normally room temperature is sufficient to insure a gaseous system in the discharge tube and therefore for reasons of economy this is the preferred temperature to use in the practice of our invention. Temperature is no more critical to the disproportionation reaction of this invention than to the reaction in the silent discharge tube, the only effect of temperature variation being a corresponding increase or decrease in the reaction rate. Here again, as in the case of the reaction in the discharge tube, room temperature is preferred for reasons of economy.

In the operation of the discharge tube we have found that optimum results are obtained when the molar ratio of the alkane to the borontrihalide is within the limits from about 1:1 to about 10:1 and the ratio of potential drop to annular space gap to gas pressure in the annular space is within the range from about 10 volts/mm. gap/mm. of Hg to about 90 volts/mm. gap/mm. of Hg. The reaction is preferably conducted at a gas pressure of about 100 mm. of Hg although other elevated pressures such as those within the range from about 100 to about 1100 mm. of Hg may be used within the scope of the invention, if desired. The optimum residence time of the gas in the discharge tube depends upon the pressure of the gas, the magnitude of the potential and the width of the annular gap. We have found that residence times from about ½ to about 4 minutes produce satisfactory results when the gas pressure is about 100 mm. of Hg, the gap width is within the range from about 2 mm. to about 5 mm., and the potential is between about 5,000 and about 20,000 volts. The preferred range of voltages in the present invention is that from about 8,000 to about 15,000 volts.

Separation of the mixtures of products from the discharge tube or the subsequent disproportionation mixtures can be easily accomplished by methods well-known to those skilled in the art. For example, the discharge tube products can be separated by fractional condensation and the disproportionation mixtures can be readily separated by stripping because of the greater volatility of the trialkylboron components.

It will be appreciated that a wide variety of alkylboron compounds can be prepared by the method of our invention. For example, borontribromide reacts with hexane in a silent discharge tube to yield hexyldibromoborine which upon disproportionation yields trihexylboron. It is within the scope of our invention to produce trialkylborons having more than one particular alkyl radical present in the molecule. For example, a mixture of ethyldipropylboron and other trialkylboron compounds can be produced by reacting a mixture of ethane and propane with a borontrihalide such as borontriiodide in a silent discharge tube, and effecting disproportionation of the resulting products. Other alkylboron compounds of the class disclosed herein can be prepared in accordance with the method of our invention by simply employing the appropriate starting materials.

The disproportionation method and apparatus of assignee's copending U.S. patent application Ser. No. 801,395, filed concurrently with the present application, can be employed to effect disproportionation of the alkyldihaloborines of this invention and recovery of the resulting trialkylborons, if desired. However, because of the rapidity with which alkyldihaloborines disproportionate and the ease with which the resulting trialkylborons can be separated from the disproportionation mixtures, the preferred way of practicing the disproportionation step of this invention is simply by allowing the alkyldihaloborine to reach disproportionation equilibrium in a confined space which is preferably under vacuum and the preferred way of separating the trialkylboron from the disproportionation mixture is by means of a stripping operation. Stripping can be easily accomplished in stripper units well-known to those skilled in the art.

The term "silent discharge tube" as used throughout this application denotes a tube or equivalent apparatus for containing the gaseous reactions in conjunction with means for subjecting the reactants to a silent discharge. The term "silent discharge" has a definite and well-understood meaning in the art of electric discharge synthesis and the method of this invention is operable with all types of silent discharges in view of their similar characteristics.

The following is offered by way of explanation of the term "silent discharge." An electric current will flow between 2 electrodes separated by a gaseous medium when a difference of potential exists between the electrodes. The magnitude of the current flow is dependent upon the distance between the electrodes and their shape, the magnitude of the potential difference, the gas temperature, the gas pressure, and the nature of the gaseous medium. The application of voltages up to a few hundred volts on a pair of electrodes separated by a gaseous medium will produce a small current flow of the order of microamperes. This Townsend or "dark" current flow is dependent upon the few ions which are always present in a gas due to light or cosmic rays. An increase of the voltage applied to the electrodes will cause a slow current increase resulting from the faster ion movement brought about by the increasing electric field. When an applied potential in the order of magnitude of thousands of volts is reached there occurs a sharp increase of current flow to a value of the order of milliamperes. The exact point at which this occurs is dependent upon various factors such as the electrode separation and the chemical nature of the gas, its pressure and temperature. This increase in current is attributable to an increase in the concentration of ions and electrons in the gas, caused by the formation of new ions from collision of electrons already present with neutral molecules. The marked current rise occurs when the electric field has become strong enough to provide the electrons with sufficient energy to ionize neutral molecules upon collision.

A further increase of applied voltage will cause a continual increase in the number of ions, accordingly increasing current flow. A point is ultimately reached in which there occurs a sudden current increase to the order of many amperes. Simultaneously, the potential difference between the two electrodes drops to a few volts, and there occurs a high-current arc. The phenomenon whereby there occurs a sudden increase in current flow and decrease in voltage is commonly referred to as "breakdown." The arc discharge may be characterized by extremely high gas temperatures of the order of thousands of degrees. In such a state, the thermal kinetic energy of the ions and molecules is sufficient to bring further ionized collisions resulting in very high ion concentrations.

The present invention pertains only to the type of discharge occurring before breakdown. That is the type of discharge wherein the current densities are of the order of a few milliamperes per square centimeter and where the voltages involved are of a relatively high magnitude. Such discharges include those commonly known as corona, glow, brush, and electrodeless, and are frequently referred to generically as "silent electric discharges." Thus, in the specification and claims the term "silent discharge" means a discharge of the type characterized by a relatively high voltage, a relatively low current density, and a relatively low gas temperature as contrasted to the low voltage, high current, and high temperature of the arc discharge.

We claim:

1. The method of preparing trialkylborons, which comprises subjecting a gaseous mixture of a borontrihalide and a lower alkane to the discharge produced by a silent discharge tube to form an alkyldihaloborine and effecting disproportionation of the alkyldihaloborine to form the corresponding trialkylboron.

2. The method of preparing trialkylborons, which comprises subjecting a gaseous mixture of a boron trihalide and a lower alkane to the discharge produced by a silent discharge tube, having electrodes separated from the gas space by insulating layers and energized by an alternating potential, to form an alkyldihaloborine, and effecting disproprotionation of the alkyldihaloborine to form the corresponding trialkylboron.

3. The method of preparing trialkylborons, which comprises subjecting a gaseous mixture of a borontrihalide and a lower alkane to the discharge produced by a silent discharge tube, having electrodes separated from the gas space by insulating layers and energized by an alternating potential, to form an alkyldihaloborine, substantially separating the alkyldihaloborine from the gases formed in the silent discharge tube, effecting disproportionation of the alkyldihaloborine and recovering the trialkylboron from the resulting disproportionation mixture.

4. The method of claim 3 wherein, the alkyldihaloborine is recovered from the mixture of gases formed in the silent discharge tube by fractional condensation means.

5. The method of claim 4, wherein the mole ratio of the lower alkane to the borontrihalide is from about 1:1 to about 10:1.

6. The method of claim 3 wherein, the trialkylboron is recovered from the disproportionation mixture by stripping means.

7. The method of preparing trialkylborons, which comprises subjecting a gaseous mixture of a borontrihalide and a lower alkane to the discharge produced by a silent discharge tube having electrodes separated from the gas space by insulating layers and energized by an alternating potential of from about 10 volts/mm. gap/mm. of Hg gas pressure to about 90 volts/mm. gap/mm. of Hg gas pressure, to form an alkyldihaloborine, and effecting disproportionation of the alkyldihaloborine to form the corresponding trialkylboron.

8. The method of preparing trialkylborons, which comprises subjecting a gaseous mixture of a borontrihalide and a lower alkane, at a gas pressure of from about 100 mm. to about 1100 mm. of Hg, to the discharge produced by a silent discharge tube having electrodes separated from the gas space by insulating layers and energized by an alternating potential of from about 10 volts/mm. gap/mm. of Hg gas pressure to about 90 volts/mm. gap/mm. of Hg gas pressure, to form an alkyldihaloborine, and effecting disproportionation of the alkyldihaloborine to form the corresponding trialkylboron.

9. The method of preparing trialkylborons, which comprises subjecting a gaseous mixture of a borontrihalide and a lower alkane, at a gas pressure of from about 100 mm. to about 1100 mm. of Hg, to the discharge produced by a silent discharge tube having electrodes separated from the gas space by insulating layers, a gap width of from about 2 mm. to about 5 mm., and energized by an alternating potential of from about 5,000 to about 20,000 volts, to form an alkyldihaloborine, and effecting disproportionation of the alkyldihaloborine to form the corresponding trialkylboron.

10. The method of preparing trialkylborons, which comprises subjecting a gaseous mixture of a borontrihalide and a lower alkane, at a gas pressure of from about 100 mm. to about 1100 mm. of Hg, to the discharge produced by a silent discharge tube having electrodes separated from the gas space by insulating layers, a gap width of from about 2 mm. to about 5 mm., and energized by an alternating potential of from about 5,000 to about 20,000 volts, for a period of time from about ½ to about 4 min., to form an alkyldihaloborine, and effecting disproportionation of the alkyldihaloborine to form the corresponding trialkylboron.

11. The method of preparing trimethylboron, which comprises subjecting a gaseous mixture of borontrichloride and methane to the discharge produced by a silent discharge tube, to form methyldichloroborine, and effecting disproportionation of the methyldichloroborine to form trimethylboron.

12. The method of preparing trihexylboron, which comprises subjecting a gaseous mixture of borontribromide and hexane to the discharge produced by a silent discharge tube, to form hexyldibromoborine, and effecting disproportionation of the hexyldibromoborine to form trihexylboron.

13. The method of preparing trimethylboron, which comprises subjecting a gaseous mixture of borontrichloride and methane to the discharge produced by a silent discharge tube having electrodes separated from the gas space by insulating layers and energized by an alternating potential of from about 10 volts/mm. gap/mm. of Hg gas pressure to about 90 volts/mm. gap/mm. of Hg gas pressure, to form methyldichloroborine, and effecting disproportionation of the methyldichloroborine to form trimethylboron.

14. The method of preparing trimethylboron, which comprises subjecting a gaseous mixture of borontrichloride and methane, at a gas pressure of from about 100 mm. to about 1100 mm. of Hg, to the discharge produced by a silent discharge tube having electrode separated from the gas space by insulating layers, a gap width from about 2 to about 5 mm., and energized by an alternating potential of from about 5,000 to about 20,000 volts, to form methyldichloroborine, and effecting disproportionation of the methyldichloroborine to form trimethylboron.

15. The method of preparing trimethylboron, which comprises subjecting a gaseous mixture of methane and borontrichloride, at a gas pressure of from about 100 mm. to about 1100 mm. of Hg, to the discharge produced by a silent discharge tube having electrodes separated from the gas space by insulating layers, a gap width of from about 2 to about 5 mm., and energized by an alternating potential of from about 8,000 to about 15,000 volts, for a period of time from about ½ to about 4 min., to form methyldichloroborine, and effecting disproportionation of the methyldichloroborine to form trimethylboron.

16. The method of claim 15 wherein the mole ratio of the methane to the borontrichloride is from about 1:1 to about 10:1.

17. The method of preparing trialkylborons by effecting disproportionation of an alkyldihaloborine.

18. The method of preparing trimethylboron, which comprises subjecting a gaseous mixture of methane and borontrichloride, at a gas pressure from about 100 to about 1100 mm. of Hg, to the discharge produced by a silent discharge tube having electrodes separated from the gas space by insulating layers, a gap width from about 2 to about 5 mm., and energized by an alternating potential of from about 5,000 to about 20,000 volts, to form methyldichloroborine; separating methyldichloroborine by fractional condensation from the mixture of gases formed in the silent discharge tube; subjecting the methyldichloroborine thus separated to confinement under vacuum to effect disproportionation thereof; and recovering trimethylboron formed as a product of the disproportionation reaction from the resulting disproportionation mixture by stripping means.

References Cited

UNITED STATES PATENTS

| | | | |
|---|---|---|---|
| 2,834,055 | 5/1958 | Akerlof | 204—168 XR |
| 2,882,317 | 4/1959 | Hoffman et al. | 260—543 |
| 2,930,743 | 3/1960 | Schechter et al. | 204—165 |

OTHER REFERENCES

Berichte der Deutschen Chemischen Gesellschaft, vol. 69B (1936) pp. 1456, 1457.

Journal of American Chemical Society, vol. 80 (July 1958) pp. 3480 to 3482.

HOWARD S. WILLIAMS, *Primary Examiner.*

ROGER L. CAMPBELL, WILLIAM C. WILES, JOHN R. SPECK, *Examiners.*

R. EPSTEIN, *Assistant Examiner.*